(12) United States Patent
Horiuchi et al.

(10) Patent No.: US 11,716,817 B2
(45) Date of Patent: Aug. 1, 2023

(54) BOARD DESIGN ASSISTANCE DEVICE, BOARD DESIGN ASSISTANCE METHOD, AND RECORDING MEDIUM

(71) Applicant: Mitsubishi Electric Corporation, Tokyo (JP)

(72) Inventors: Shinichiro Horiuchi, Tokyo (JP); Toru Tateishi, Tokyo (JP); Kohji Matsuura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/642,539

(22) PCT Filed: Oct. 26, 2020

(86) PCT No.: PCT/JP2020/040125
§ 371 (c)(1),
(2) Date: Mar. 11, 2022

(87) PCT Pub. No.: WO2021/111762
PCT Pub. Date: Jun. 10, 2021

(65) Prior Publication Data
US 2022/0330434 A1 Oct. 13, 2022

(30) Foreign Application Priority Data
Dec. 5, 2019 (JP) .................... 2019-220197

(51) Int. Cl.
*H05K 1/11* (2006.01)
*G06F 30/394* (2020.01)
(Continued)

(52) U.S. Cl.
CPC ......... *H05K 3/0005* (2013.01); *G06F 30/394* (2020.01); *G06F 2115/12* (2020.01)

(58) Field of Classification Search
CPC .... H05K 3/0005; H05K 1/111; H05K 3/3442; H05K 2201/029; H05K 2201/10636; G06F 30/394; G06F 2115/12; G06F 2119/14
See application file for complete search history.

(56) References Cited

U.S. PATENT DOCUMENTS 7,022,919 B2 * 4/2006 Brist .................... H05K 1/0248
716/137
9,226,404 B2 * 12/2015 Ai ........................ H05K 1/0248

FOREIGN PATENT DOCUMENTS

| JP | 2002016337 A | 1/2002 |
| JP | 2007081072 A | 3/2007 |
| JP | 2009151363 A | 7/2009 |

* cited by examiner

*Primary Examiner* — Nghia M Doan
(74) *Attorney, Agent, or Firm* — Buchanan Ingersoll & Rooney PC

(57) ABSTRACT

A board design assistance device includes a design data acquirer to acquire design data for a printed circuit board, a first determiner to determine, based on the design data for the printed circuit board, whether a lengthwise direction of board fiber in the printed circuit board is perpendicular to a longitudinal direction of an electronic component mounted on the printed circuit board, a second determiner to determine, based on the design data for the printed circuit board, whether a wire is routed crosswise from a pad receiving the electronic component mounted on the printed circuit board, and a notifier to provide a notification including error information specifying an electronic component determined to have a longitudinal direction not perpendicular to the lengthwise direction of the board fiber and determined to be connected to a pad from which a wire is not routed crosswise.

20 Claims, 15 Drawing Sheets

(51) Int. Cl.
*H05K 3/00* (2006.01)
*G06F 115/12* (2020.01)

BOARD DESIGN ASSISTANCE DEVICE, BOARD DESIGN ASSISTANCE METHOD, AND RECORDING MEDIUM

TECHNICAL FIELD

The present disclosure relates to a board design assistance device, a board design assistance method, and a program.

BACKGROUND ART

With the trend toward smaller chip ceramic capacitors for a printed circuit board, a 1005 chip with a size of 1.0×0.5 mm is to be replaced with a chip with a size smaller than or equal to 0.6×0.3 mm with any packaging density. Electronic components including ceramic capacitors have connection terminals soldered onto pads on a printed circuit board. Electronic components on the printed circuit board are routed in a conductor pattern connected to pads to be a circuit. Forming a pattern connected to pads is hereafter referred to as routing wires. The direction in which the pattern connected to the pads extends from the pads is referred to as a wire routing direction. A ceramic capacitor with a size smaller than or equal to 0.6×0.3 mm is smaller than a 1005-chip ceramic capacitor, and thus is connected to smaller pads. The width of the pattern connected to the pads is thus large relative to the size of the pads receiving the ceramic capacitor. In this structure, the pattern may pull and push the pads with a greater force when the board bends or thermally expands, thus placing greater stress on the ceramic capacitor. This increases the likelihood of cracks in the ceramic capacitor.

Non-Patent Literature 1 describes a technique for routing a wire in the crosswise direction of a ceramic capacitor instead of the longitudinal direction to reduce the likelihood of cracks in the ceramic capacitor. Routing a wire is hereafter referred to as wire routing. The wire routing in which a wire is routed in the longitudinal direction of the ceramic capacitor is referred to as straight routing, and the wire routing in which a wire is routed in the crosswise direction of the ceramic capacitor is referred to as crosswise routing.

CITATION LIST

Non Patent Literature

Non-Patent Literature 1: Points of Downsizing the Chip Multilayer Ceramic Capacitors—Notice for Board Design—Ver. 3. [Online] Sep. 28, 2018, Murata Manufacturing Co., Ltd. https://www.murata.com/~/media/webrenewal/products/capacitor/mlcc/faq/mnt/small-mlcc-caution-ver3.ashx?la=ja-jp (accessed Oct. 17, 2019)

SUMMARY OF INVENTION

Technical Problem

To reduce the likelihood of cracks in the ceramic capacitor, the technique described in Non-Patent Literature 1 uses crosswise routing for routing wires from the pads receiving the ceramic capacitor. This wire routing may reduce flexibility in the layout of electronic components including the ceramic capacitor. Additionally, cracks are to be reduced for any electronic components on the printed circuit board.

In response to the above issue, an objective of the present disclosure is to assist a designer of a printed circuit board in reliably designing a layout for reducing the likelihood of cracks in electronic components including a ceramic capacitor, while allowing the designer to flexibly arrange the electronic components including the ceramic capacitor on the printed circuit board.

Solution to Problem

To achieve the above objective, a board design assistance device according to an aspect of the present disclosure includes a design data acquirer, a first determiner, a second determiner, and a notifier. The first determiner determines, based on design data for a printed circuit board, whether a lengthwise direction of board fiber in the printed circuit board is perpendicular to a longitudinal direction of an electronic component mounted on the printed circuit board. The second determiner determines, based on the design data for the printed circuit board, whether a wire is routed crosswise from a pad receiving the electronic component mounted on the printed circuit board. The notifier provides a notification including error information specifying an electronic component determined by the first determiner to have a longitudinal direction not perpendicular to the lengthwise direction of the board fiber and determined by the second determiner to be connected to a pad from which a wire is not routed crosswise.

Advantageous Effects of Invention

The board design assistance device according to the above aspect of the present disclosure reduces the likelihood of cracks in electronic components. The device assists in designing a printed circuit board including at least one of the structure in which wires are routed crosswise from the pads receiving an electronic component mounted on the printed circuit board or the structure in which the lengthwise direction of the fiber of the board is perpendicular to the longitudinal direction of the electronic component mounted on the printed circuit board. A notification is provided when a designer of the printed circuit board creates design data including neither of these structures that reduce the likelihood of cracks in the electronic components. The structure in the above aspect of the present disclosure thus allows the designer to avoid creating design data without noticing the design data lacking these structures. The structure thus assists the designer in reliably designing a layout for reducing the likelihood of cracks in electronic components including a ceramic capacitor while allowing the designer to flexibly arrange the electronic components including the ceramic capacitor.

DESCRIPTION OF EMBODIMENTS

Figure 1:
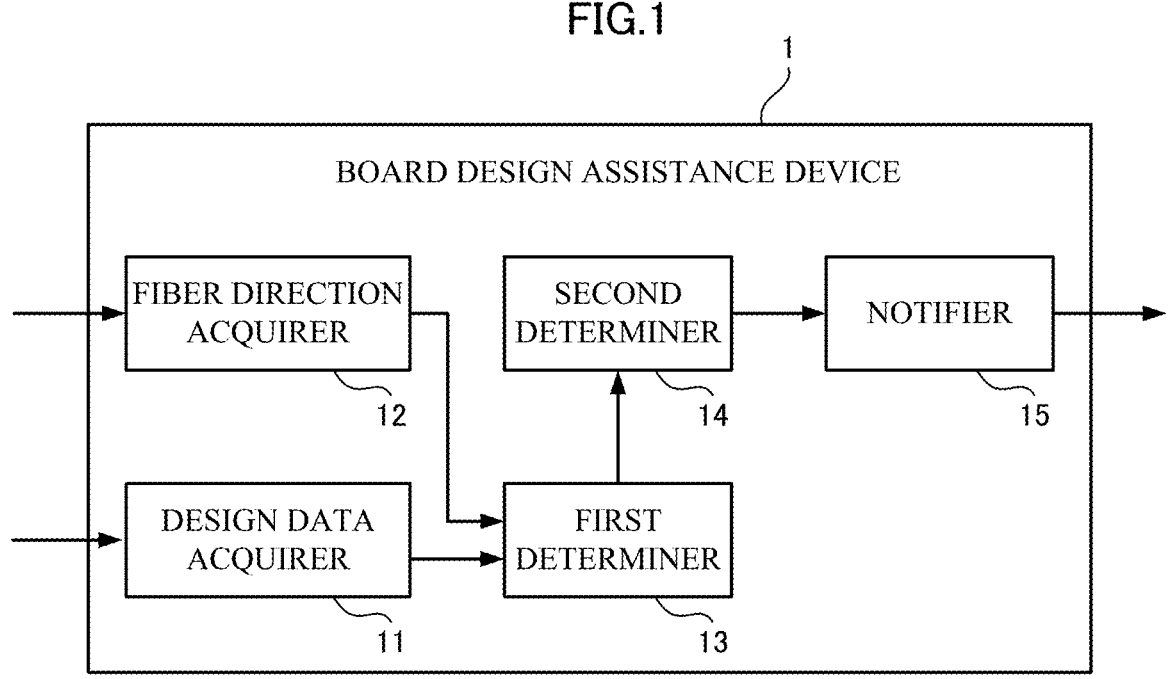
FIG. 1 is a functional block diagram of a board design assistance device according to an embodiment.

A board design assistance device according to an embodiment will now be described in detail with reference to the drawings. Throughout the drawings, the same or corresponding components are given the same reference numerals. In the present embodiment, a ceramic capacitor mounted on a printed circuit board is connected to pads. Wire routing from the pads in the longitudinal direction of the ceramic capacitor is referred to as straight routing, and wire routing from the pads in the crosswise direction of the ceramic capacitor is referred to as crosswise routing. The printed circuit board may include, as a base material, pre-preg formed from a fiber-reinforced material such as glass cloth or carbon fiber uniformly impregnated with a thermosetting resin and partially cured. In the present embodiment, the direction in which pre-preg is pulled in the process of impregnation of a fiber-reinforced material with a thermosetting resin during manufacturing of pre-preg is defined as a lengthwise direction of the fiber of a board.

The ceramic capacitor mounted on the printed circuit board having the longitudinal direction perpendicular to the lengthwise direction of the board fiber receives less stress than when having the longitudinal direction parallel to the lengthwise direction of the board fiber. This reduces the likelihood of cracks in the ceramic capacitor. The ceramic capacitor mounted on the printed circuit board having the longitudinal direction perpendicular to the lengthwise direction of the board fiber is less likely to crack in the manner as described in Japanese Patent Application No. 2019-153521. Routing wires crosswise from the pads receiving a ceramic capacitor mounted on the printed circuit board applies less stress to the ceramic capacitor than when routing the wires straight. This reduces the likelihood of cracks in the ceramic capacitor. The embodiment uses design rules including at least one of the structure in which the lengthwise direction of the board fiber is perpendicular to the longitudinal direction of the ceramic capacitor mounted on the printed circuit board or the structure in which wires are routed crosswise from the pads receiving the ceramic capacitor mounted on the printed circuit board. A board design assistance device according to the present embodiment examines design data for a printed circuit board created by a designer and provides a notification to the designer when the design data includes neither of the structures that reduce the likelihood of cracks in the ceramic capacitor, or in other words, when the design data deviates from the design rules.

The functional components of a board design assistance device 1 according to an embodiment will be described with reference to FIG. 1. The board design assistance device 1 includes a design data acquirer 11 that acquires design data for a printed circuit board, a fiber direction acquirer 12 that acquires fiber direction information indicating the lengthwise direction of the board fiber in the printed circuit board indicated by the design data, a first determiner 13 that determines whether the lengthwise direction of the board fiber is perpendicular to the longitudinal direction of the ceramic capacitor mounted on the printed circuit board, a second determiner 14 that determines whether wires are routed crosswise from the pads receiving the ceramic capacitor mounted on the printed circuit board, and a notifier 15 that outputs error information indicating a ceramic capacitor deviating from the design rules.

The design data acquirer 11 receives an input of design data for a printed circuit board or may acquire design data for a printed circuit board from an external device or system. For the board design assistance device 1 including an application allowing creation of design data for a printed circuit board, the design data acquirer 11 may acquire design data for the printed circuit board stored in the board design assistance device 1.

The fiber direction acquirer 12 receives an input of fiber direction information indicating the lengthwise direction of the fiber of the board in the printed circuit board design data or may acquire the fiber direction information from an external device or system. For example, when the fiber direction information is pre-associated with the printed circuit board design data, such as when the fiber direction information is included in the properties of the printed circuit board design data, the fiber direction acquirer 12 may acquire fiber direction information from the printed circuit board design data acquired by the design data acquirer 11. This structure can reduce erroneous manual inputs of the lengthwise direction of the board fiber.

The first determiner 13 extracts any ceramic capacitor with a predetermined size mounted on the printed circuit board from the printed circuit board design data acquired by the design data acquirer 11. The predetermined size is, for example, 0.6×0.3 mm or smaller. The first determiner 13 determines the longitudinal direction of the extracted ceramic capacitor(s). The first determiner 13 determines, for each ceramic capacitor extracted from the printed circuit board design data, whether the longitudinal direction is perpendicular to the lengthwise direction of the board fiber in the printed circuit board design data indicated by the fiber direction information acquired by the fiber direction acquirer 12. The first determiner 13 transmits, to the second determiner 14, design data specifying any ceramic capacitor having the longitudinal direction not perpendicular to the lengthwise direction of the board fiber. The ceramic capacitor having the longitudinal direction not perpendicular to the lengthwise direction of the board fiber may be indicated by, for example, adding information identifying such a ceramic capacitor(s) to the design data or changing the color of such a ceramic capacitor(s) from other ceramic capacitors for identification of such a ceramic capacitor(s).

Figure 9A:
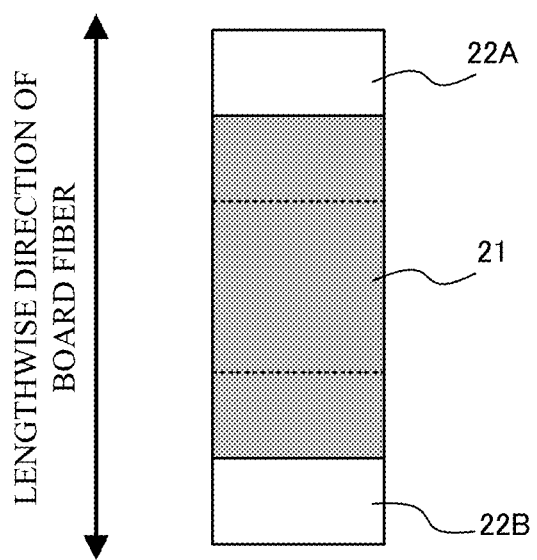
FIG. 9A is a plan view of an example ceramic capacitor having the longitudinal direction not perpendicular but parallel to the lengthwise direction of fiber of the board fiber in an embodiment.
Figure 9B:
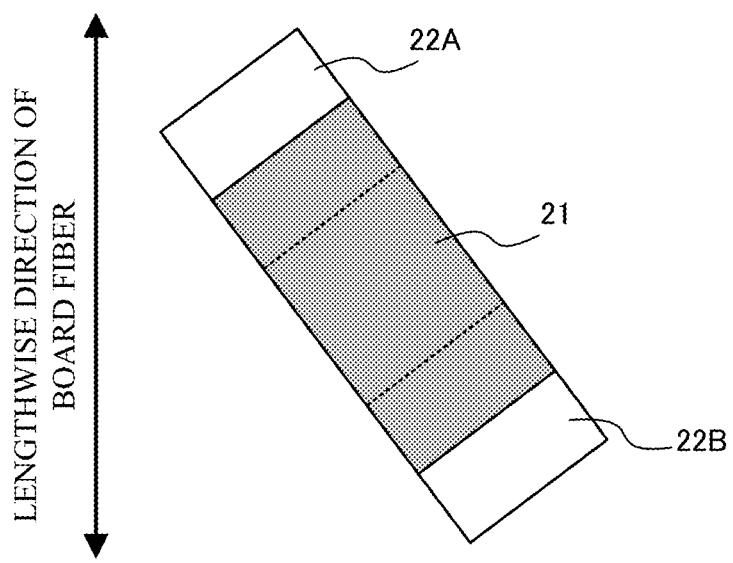
FIG. 9B is a plan view of an example ceramic capacitor having the longitudinal direction not perpendicular nor parallel to the lengthwise direction of fiber of the board in an embodiment.
Figure 9C:
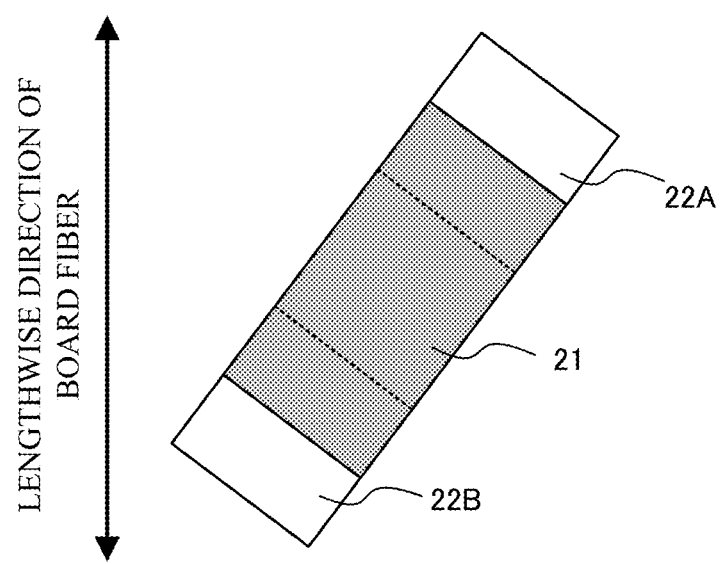
FIG. 9C is a plan view of another example ceramic capacitor having the longitudinal direction not perpendicular nor parallel to the lengthwise direction of fiber of the board in an embodiment.

The first determiner 13 determines whether the lengthwise direction of the board fiber is perpendicular to the longitudinal direction of the ceramic capacitor mounted on the printed circuit board in the manner described below in detail with reference to FIGS. 9A to 10. As shown in FIG. 9A, when the lengthwise direction of the board fiber does not cross the longitudinal direction of the ceramic capacitor 21, the first determiner 13 determines that the lengthwise direction of the board fiber is not perpendicular to the longitudinal direction of a ceramic capacitor 21 mounted on the printed circuit board. As shown in FIGS. 9B and 9C, when the lengthwise direction of the board fiber obliquely crosses the longitudinal direction of the ceramic capacitor 21, the first determiner 13 also determines that the lengthwise direction of the board fiber is not perpendicular to the longitudinal direction of the ceramic capacitor 21.

Figure 10:
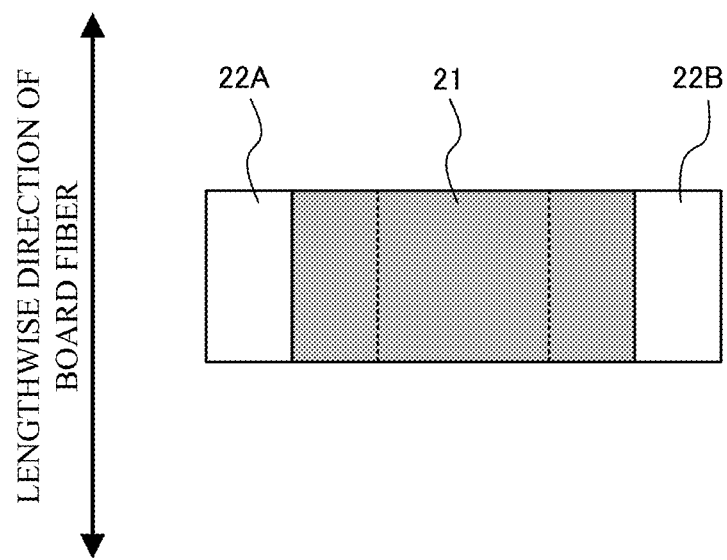
FIG. 10 is a plan view of an example ceramic capacitor having the longitudinal direction perpendicular to the lengthwise direction of fiber of the board in an embodiment.

In contrast, the first determiner 13 determines that the lengthwise direction of the board fiber is perpendicular to the longitudinal direction of the ceramic capacitor 21 when the lengthwise direction of the board fiber crosses the longitudinal direction of the ceramic capacitor 21 at right angles as shown in FIG. 10. As shown in FIG. 10, the ceramic capacitor 21 having the longitudinal direction perpendicular to the lengthwise direction of the board fiber is less likely to crack than when having the longitudinal direction not perpendicular to the lengthwise direction of the board fiber as in FIGS. 9A to 9C. The first determiner 13 may determine that the lengthwise direction of the board fiber is perpendicular to the longitudinal direction of the ceramic capacitor 21 when the directions cross each other within a predetermined range including 90 degrees, and may determine that the directions are not perpendicular to each other when the directions cross each other at an angle out of the predetermined range.

The first determiner 13 may determine, for the ceramic capacitor 21 determined to have the longitudinal direction not perpendicular to the lengthwise direction of the board fiber, whether the longitudinal direction is parallel to the lengthwise direction of the board fiber. As shown in FIG. 9A, when the longitudinal direction of the ceramic capacitor 21 mounted on the printed circuit board does not cross the lengthwise direction of the board fiber, the first determiner 13 determines that the lengthwise direction of the board fiber is parallel to the longitudinal direction of the ceramic capacitor 21. As shown in FIGS. 9B and 9C, when the longitudinal direction of the ceramic capacitor 21 obliquely crosses the lengthwise direction of the board fiber, the first determiner 13 determines that the lengthwise direction of the board fiber is not parallel to the longitudinal direction of the ceramic capacitor 21. The first determiner 13 transmits, to the notifier 15, review-requesting information specifying any ceramic capacitor 21 having the longitudinal direction not perpendicular nor parallel to the lengthwise direction of the board fiber.

Referring back to FIG. 1, the second determiner 14 in the board design assistance device 1 determines, for each ceramic capacitor having the longitudinal direction not perpendicular to the lengthwise direction of the board fiber in the design data received from the first determiner 13, whether the wires are routed crosswise from the pads. The second determiner 14 transmits, to the notifier 15, error information specifying any ceramic capacitor deviating from the design rules, or more specifically, any ceramic capacitor having the longitudinal direction not perpendicular to the lengthwise direction of the board fiber and connected to pads from which wires are not routed crosswise.

Figure 2:
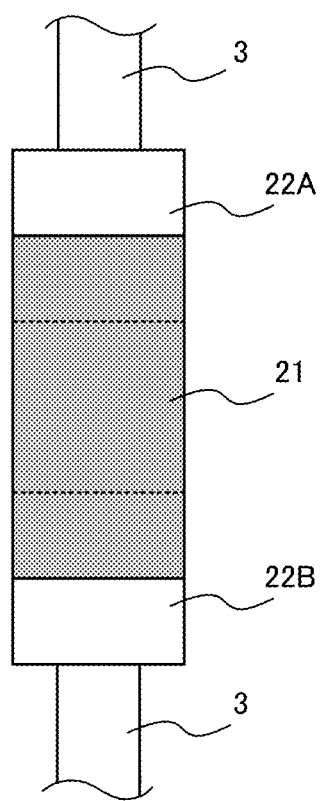
FIG. 2 is a plan view of wires routed straight in an embodiment.
Figure 3:
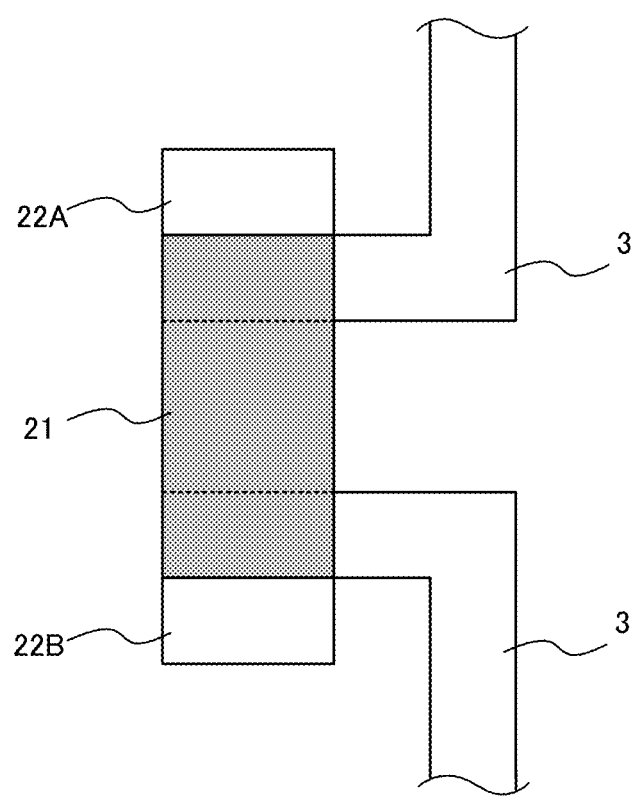
FIG. 3 is a plan view of wires routed crosswise in an embodiment.

The wire routing from the pads receiving the ceramic capacitor will now be described in detail with reference to FIGS. 2 and 3. In the figures, the shaded rectangle indicates the ceramic capacitor 21 soldered onto pads 22A and 22B mounted on the printed circuit board. The blank portions in the pads 22A and 22B in the figures indicate portions not overlapping the ceramic capacitor 21. In the figures, the broken lines indicate the peripheries of the pads 22A and 22B overlapping the ceramic capacitor 21 to be hidden under the ceramic capacitor 21. Wires 3 are routed from the pads 22A and 22B. The wires 3 are patterns on the printed circuit board. In the example shown in FIG. 2, the wires 3 extend from the pads 22A and 22B in the longitudinal direction of the ceramic capacitor 21. In other words, the wires 3 are routed from the pads 22A and 22B in the longitudinal direction of the ceramic capacitor 21. The wire routing in FIG. 2 is referred to as straight routing. In the example shown in FIG. 3, the wires 3 extend from the pads 22A and 22B in the crosswise direction of the ceramic capacitor 21 before extending in the longitudinal direction. In other words, the wires 3 are routed from the pads 22A and 22B in the crosswise direction of the ceramic capacitor 21. The wire routing in FIG. 3 is referred to as crosswise routing. Routing the wires 3 crosswise from the pads 22A and 22B receiving the ceramic capacitor 21 mounted on the circuit board can reduce the likelihood of cracks in the ceramic capacitor 21 more than routing the wires 3 straight.

Figure 4:
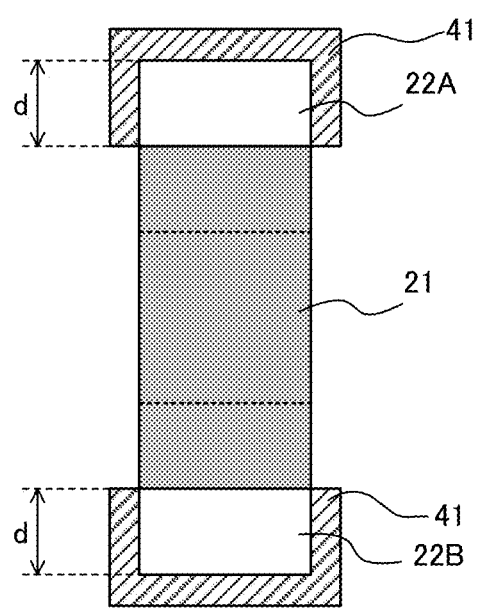
FIG. 4 is a plan view of expansion pads placed in position in an embodiment.

The second determiner 14 determines whether the wires are routed crosswise from the pads receiving the ceramic capacitor in the manner described in detail below with reference to FIGS. 4 to 8. The second determiner 14 temporarily places expansion pads 41 on the pads 22A and 22B receiving the ceramic capacitor 21 determined to have the longitudinal direction not perpendicular to the lengthwise direction of the board fiber in the design data received from the first determiner 13. As shown in FIG. 4, each expansion pad 41 is placed outside a peripheral portion of the pad 22A or 22B from the corresponding outermost side of the ceramic capacitor 21 in the longitudinal direction viewed from the center of the ceramic capacitor 21 to the positions of a length d on the lateral sides continuous from the outermost side. The length d is shorter than the length acquired by subtracting the pattern width of the wires 3 from the length of the lateral sides of the pads 22A and 22B.

Figure 5:
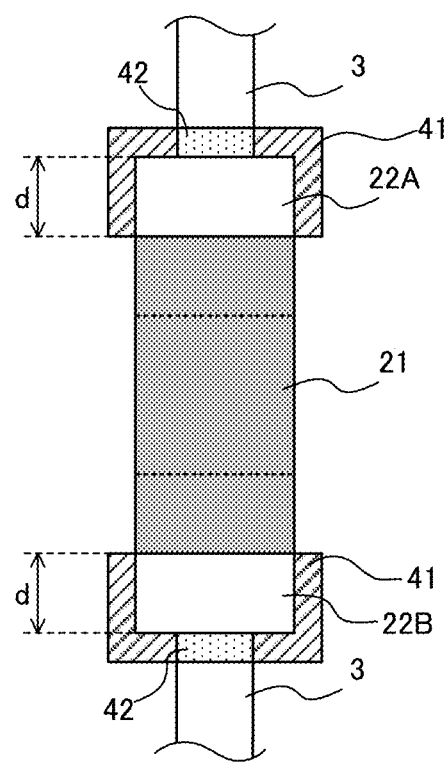
FIG. 5 is a plan view of example wires for a ceramic capacitor not routed crosswise in an embodiment.
Figure 6:
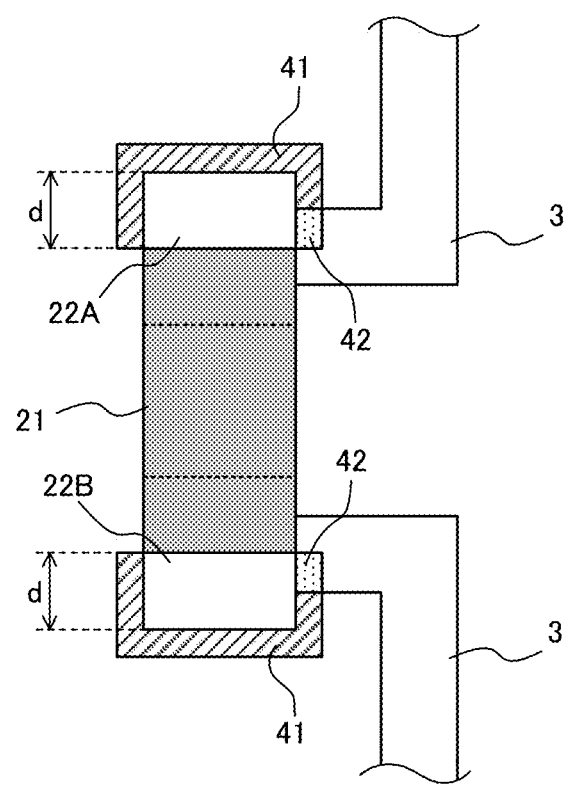
FIG. 6 is a plan view of example wires for a ceramic capacitor not regarded as being routed crosswise in an embodiment.
Figure 7:
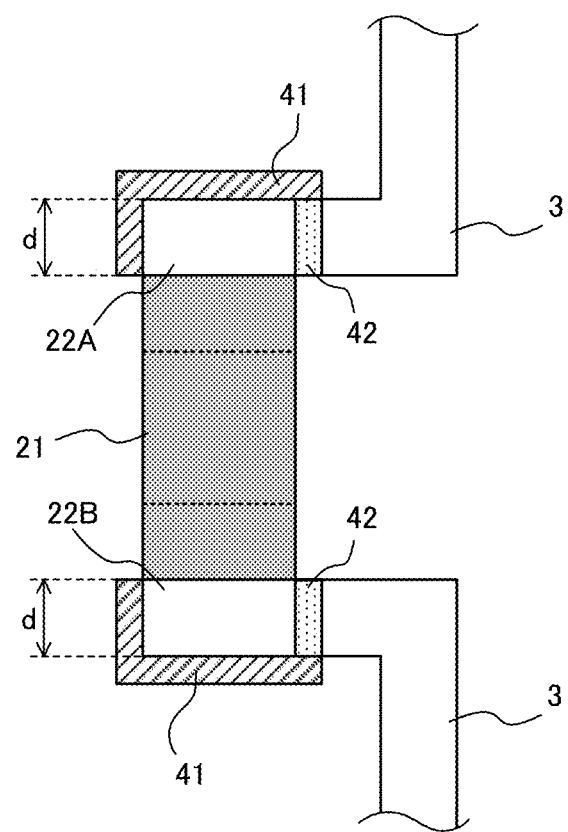
FIG. 7 is a plan view of another example wires for a ceramic capacitor not regarded as being routed crosswise in an embodiment.
Figure 8:
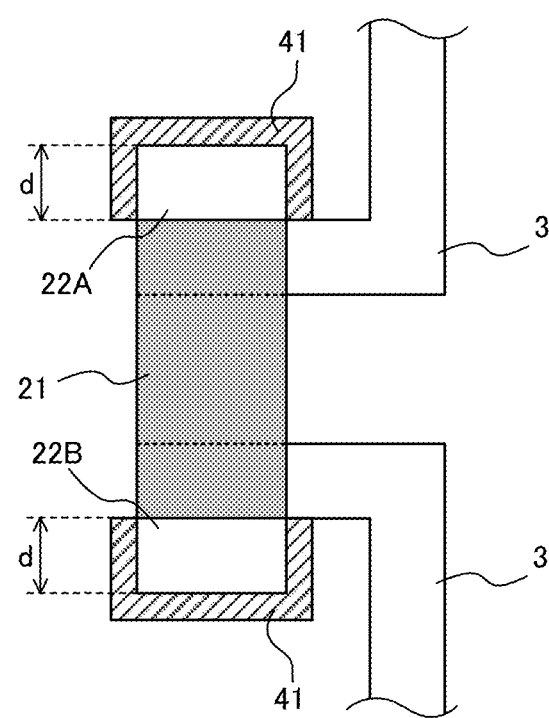
FIG. 8 is a plan view of example wires for a ceramic capacitor routed crosswise in an embodiment.

The second determiner 14 detects any overlap 42 between the expansion pads 41 and the wires 3 routed from the pads 22A and 22B receiving the ceramic capacitor 21. When the wires 3 are routed at positions overlapping the expansion pads 41 placed at the pads 22A and 22B as shown in FIGS. 5, 6, and 7, the second determiner 14 determines the overlaps 42 between the wires 3 and the expansion pads 41. When the wires 3 are routed at positions not overlapping the expansion pads 41 placed at the pads 22A and 22B as shown in FIG. 8, the second determiner 14 determines no overlap 42 between the wires 3 and the expansion pads 41.

As shown in FIG. 5, when the wires 3 are routed straight from the pads 22A and 22B receiving the ceramic capacitor 21, the wires 3 are routed from the positions of the overlaps 42 between the wires 3 and the expansion pads 41. The positions from which the wires 3 are routed are hereafter referred to as routed positions. The wire routing shown in FIGS. 6 and 7 is crosswise routing, but the routed positions are closer to the routed positions for the straight routing than the positions in the wire routing shown in FIG. 8. Thus, the wire routing shown in FIGS. 6 and 7 has higher likelihood of causing cracks in the ceramic capacitor 21 than the wire routing shown in FIG. 8. Wire routing in which the wires 3 are obliquely routed also has higher likelihood of causing cracks in the ceramic capacitor 21 for the wires routed from positions closer to the positions for the straight routing. In the present embodiment, the wire routing in which the wires 3 are routed from the positions other than the routed positions shown in FIG. 8 (including the laterally reversed positions) is not regarded as the crosswise routing. The wire routing positions not for crosswise routing may be changed by changing the length d. The length d is determined by, for example, the chip size of the ceramic capacitor 21 or the stress bearable by the ceramic capacitor 21.

When the expansion pads 41 and the wires 3 routed from the pads 22A and 22B receiving the ceramic capacitor 21 have the overlaps 42, the second determiner 14 determines that the wires 3 routed from the pads 22A and 22B receiving the ceramic capacitor 21 are not routed crosswise. The second determiner 14 transmits, to the notifier 15, error information specifying any ceramic capacitor deviating from the design rules, or more specifically, any ceramic capacitor having the longitudinal direction not perpendicular to the lengthwise direction of the board fiber and connected to the pads from which wires are not routed crosswise.

Referring back to FIG. 1, the notifier 15 in the board design assistance device 1 outputs the error information received from the second determiner 14 to provide a notification to the designer. When the first determiner 13 determines, in addition to determining whether the lengthwise direction of the board fiber is perpendicular to the longitudinal direction of the ceramic capacitor 21 mounted on the printed circuit board, whether the directions are parallel to each other, the notifier 15 also outputs the review-requesting information received from the first determiner 13 to provide a notification to the designer. The error information and the review-requesting information may be output, for example, through a screen display or a voice output, or may be transmitted to a terminal used by the designer.

Figure 11:
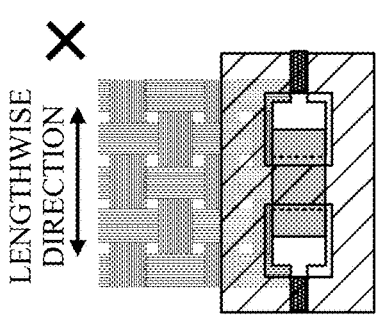
FIG. 11 is a table showing cases of a notification including error information provided or not provided to a designer.

Cases of design data deviating or not deviating from the design rules will be described with reference to FIG. 11. In the matrix shown in FIG. 11, the design marked with a cross deviates from the design rules, and the designs marked with a circle do not deviate from the design rules. As shown in FIG. 11, the design in which the wire routing is not the crosswise routing and the longitudinal direction of the ceramic capacitor is not perpendicular to the lengthwise direction of the board fiber is marked with a cross. The designs other than a design including this combination are marked with a circle. In other words, the design including at least one of the structure in which wires are routed crosswise or the structure in which the longitudinal direction of the ceramic capacitor is perpendicular to the lengthwise direction of the board fiber is marked with a circle.

Although the matrix shown in FIG. 11 shows the straight routing as a typical example of routing being not crosswise routing, the wire routing shown in FIGS. 6 and 7, in which the wires 3 are routed from the positions overlapping the expansion pads 41 placed at the pads 22A and 22B, is also included in the routing being not crosswise routing. Although the matrix shows the routing in which the longitudinal direction of the ceramic capacitor is parallel to the lengthwise direction of the board fiber as a typical example of the routing in which the longitudinal direction of the ceramic capacitor is not perpendicular to the lengthwise direction of the board fiber, the routing shown in FIGS. 9B and 9C, in which the longitudinal direction of the ceramic capacitor is oblique to the lengthwise direction of the board fiber, is also included in the routing in which the longitudinal direction is not perpendicular.

Figure 12:
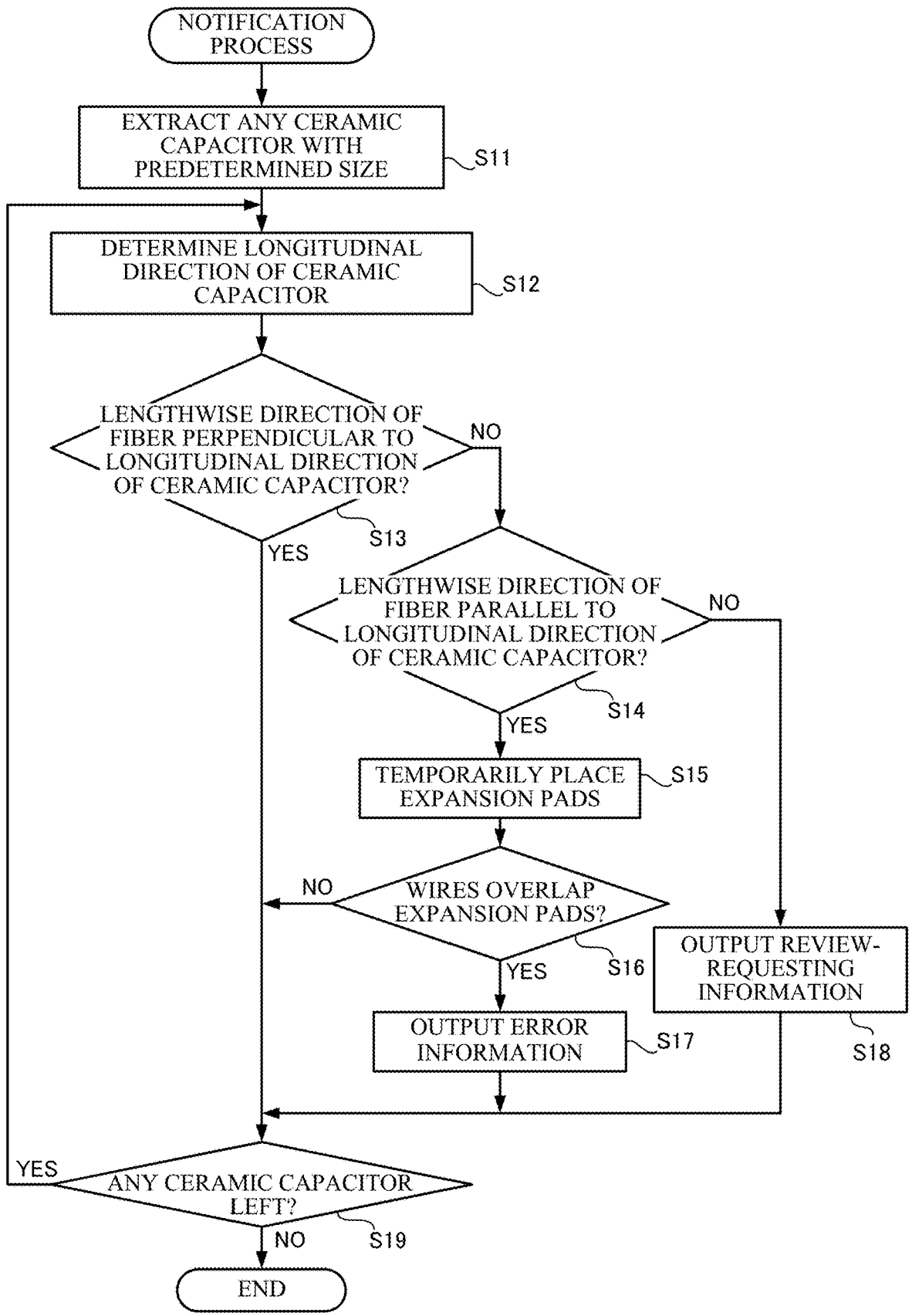
FIG. 12 is a flowchart of a notification process according to an embodiment.

A notification process performed by the board design assistance device 1 will now be described with reference to FIG. 12. The notification process shown in FIG. 12 starts upon the design data acquirer 11 in the board design assistance device 1 acquiring design data. The first determiner 13 extracts any ceramic capacitor with a predetermined size mounted on the printed circuit board from the design data for a printed circuit board acquired by the design data acquirer 11 (step S11). The predetermined size is, for example, 0.6×0.3 mm or smaller. The first determiner 13 determines the longitudinal direction of the extracted ceramic capacitor (step S12).

The first determiner 13 determines whether the lengthwise direction of the board fiber in the printed circuit board design data indicated by the fiber direction information acquired by the fiber direction acquirer 12 is perpendicular to the longitudinal direction of a ceramic capacitor (step S13). Step S13 is an example of determining whether a lengthwise direction of board fiber is perpendicular to a longitudinal direction of an electronic component. When the lengthwise direction of the board fiber is perpendicular to the longitudinal direction of the ceramic capacitor (YES in step S13), the processing advances to step S19. When the lengthwise direction of the board fiber is not perpendicular to the longitudinal direction of the ceramic capacitor (NO in step S13), the first determiner 13 determines whether the lengthwise direction of the board fiber is parallel to the longitudinal direction of the ceramic capacitor (step S14).

When the lengthwise direction of the board fiber is parallel to the longitudinal direction of the ceramic capacitor (YES in step S14), the first determiner 13 transmits, to the second determiner 14, design data specifying the ceramic capacitor having the longitudinal direction parallel to the lengthwise direction of the board fiber.

The second determiner 14 temporarily places expansion pads on the pads receiving the ceramic capacitor having the longitudinal direction parallel to the lengthwise direction of the board fiber in the design data received from the first determiner 13 (step S15). As shown in FIG. 4, the expansion pads 41 are placed on the outside of the peripheries of the pads 22A and 22B receiving the ceramic capacitor 21 having the longitudinal direction parallel to the lengthwise direction of the board fiber. Each expansion pad 41 is placed outside a peripheral portion of the pad 22A or 22B from the corresponding outermost side of the ceramic capacitor 21 in the longitudinal direction viewed from the center of the ceramic capacitor 21 to the positions of the length d on the lateral sides continuous with the outermost side. The length d is shorter than the length acquired by subtracting the pattern width of the wires 3 from the length of the lateral sides of the pads 22A and 22B.

Referring back to FIG. 12, the second determiner 14 determines whether the wires routed from the pads receiving the ceramic capacitor overlap the expansion pads (step S16). When the wires 3 are routed from the positions overlapping the expansion pads 41 placed at the pads 22A and 22B as shown in FIGS. 5, 6, and 7, the second determiner 14 determines the overlaps 42 between the wires 3 and the expansion pads 41. As shown in FIG. 8, when the wires 3 are routed from the positions not overlapping the expansion pads 41 placed at the pads 22A and 22B, the second determiner 14 determines no overlap 42 between the wires 3 and the expansion pads 41.

Referring back to FIG. 12, when the wires routed from the pads receiving the ceramic capacitor do not overlap the expansion pads (NO in step S16), the second determiner 14 determines that the wires 3 are routed crosswise from the pads 22A and 22B receiving the ceramic capacitor 21, and the processing advances to step S19. When the wires routed from the pads receiving the ceramic capacitor overlap the expansion pads (YES in step S16), the second determiner 14 determines that the wires 3 are not routed crosswise from the pads 22A and 22B receiving the ceramic capacitor 21, and transmits, to the notifier 15, error information specifying the ceramic capacitor deviating from the design rules, or more specifically, the ceramic capacitor having the longitudinal direction parallel to the lengthwise direction of the board fiber and connected to the pads from which wires are not routed crosswise. Step S16 is an example of determining whether a wire is routed crosswise from a pad receiving the electronic component. The notifier 15 outputs the error information received from the second determiner 14 (step S17). Step S17 is an example of providing a notification.

When the lengthwise direction of the board fiber is not parallel to the longitudinal direction of the ceramic capacitor (NO in step S14), the first determiner 13 transmits, to the notifier 15, review-requesting information specifying the ceramic capacitor determined to have the longitudinal direction not perpendicular nor parallel to the lengthwise direction of the board fiber. The notifier 15 outputs the review-requesting information received from the first determiner 13 (step S18).

When any ceramic capacitor has yet to undergo the processing in steps S12 to S18 among the ceramic capacitor (s) extracted in step S11 (YES in step S19), the processing returns to step S12 and repeats steps S12 to S18. When the processing in steps S12 to S18 is performed on each ceramic capacitor extracted in step S11 with no ceramic capacitor left (NO in step S19), the process ends.

The notification process is performed upon every acquisition of design data by the design data acquirer 11 in the board design assistance device 1. FIG. 12 is a flowchart of the notification process including the first determiner 13 determining whether the lengthwise direction of the board fiber is parallel to, in addition to determining perpendicular to, the longitudinal direction of the ceramic capacitor 21 mounted on the printed circuit board. The notification process including the first determiner 13 simply determining whether the lengthwise direction of the board fiber is perpendicular to the longitudinal direction of the ceramic capacitor 21 mounted on the printed circuit board, without determining whether the directions are parallel to each other, eliminates steps S14 and S18 from the flowchart.

As described above, the board design assistance device 1 according to the embodiment is a device for reducing the likelihood of cracks in the ceramic capacitor. The board design assistance device 1 assists in designing a printed circuit board including at least one of the structure in which the wires are routed crosswise from the pads receiving the ceramic capacitor mounted on the printed circuit board or the structure in which the lengthwise direction of the board fiber is perpendicular to the longitudinal direction of the ceramic capacitor mounted on the printed circuit board. The board design assistance device 1 according to the embodiment provides a notification to the designer when the design data for a printed circuit board created by the designer includes neither of these structures that reduce the likelihood of cracks in the ceramic capacitor. The designer can thus avoid creating design data without noticing that the design data lacks these structures. This assists the designer in reliably designing a layout that reduces the likelihood of cracks in the ceramic capacitor while allowing the designer to flexibly arrange electronic components including the ceramic capacitor.

Figure 13:
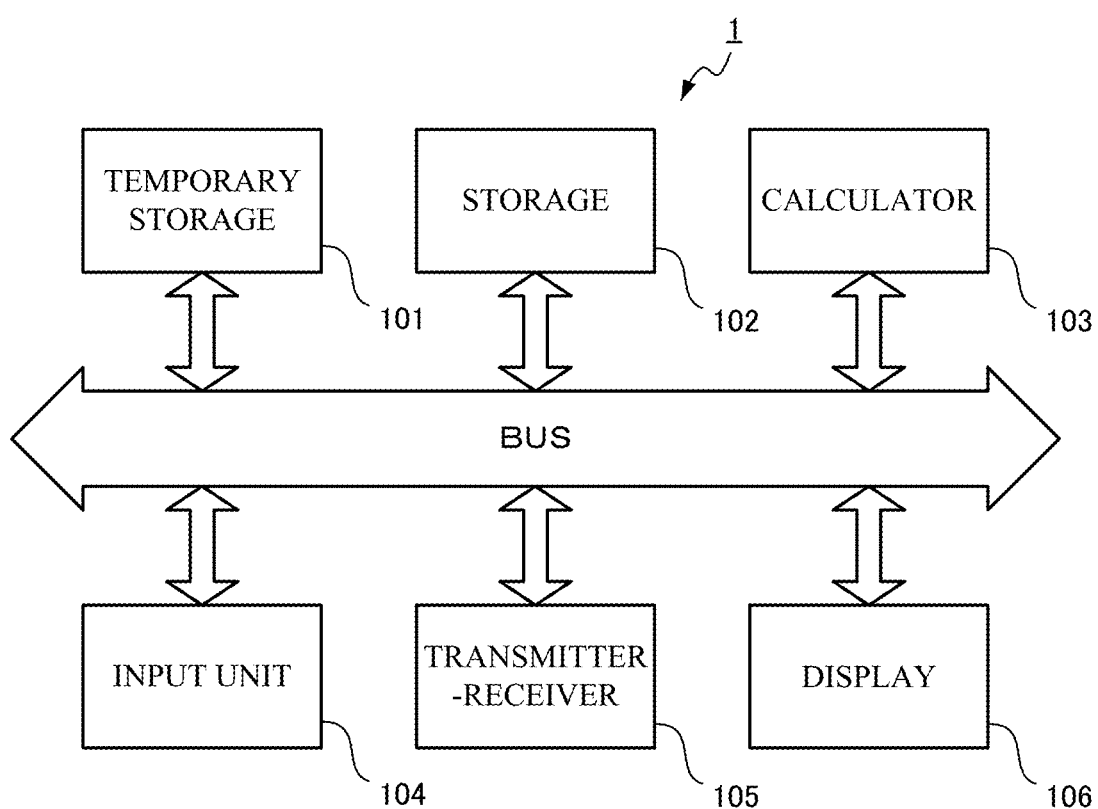
FIG. 13 is a diagram of a board design assistance device according to an embodiment showing an example hardware configuration.

A hardware configuration of the board design assistance device 1 will be described with reference to FIG. 13. As shown in FIG. 13, the board design assistance device 1 includes a temporary storage 101, a storage 102, a calculator 103, an input unit 104, a transmitter-receiver 105, and a display 106. The temporary storage 101, the storage 102, the input unit 104, the transmitter-receiver 105, and the display 106 are connected to the calculator 103 with a bus.

The calculator 103 is, for example, a central processing unit (CPU). The calculator 103 performs processes of the first and second determiners 13 and 14 in the board design assistance device 1 in accordance with a control program stored in the storage 102.

The temporary storage 101 is, for example, a random-access memory (RAM). The temporary storage 101 is used as a work area of the calculator 103 into which the control program stored in the storage 102 is loaded.

The storage 102 is a nonvolatile memory such as a flash memory, a hard disk drive, a digital versatile disc random-access memory (DVD-RAM), or a digital versatile disc rewritable (DVD-RW). The storage 102 prestores programs for causing the calculator 103 to perform processes of the board design assistance device 1, or provides data stored in the program to the calculator 103 in accordance with the instruction from the calculator 103 and stores data provided from the calculator 103.

The input unit 104 includes an input device, such as a keyboard and a pointing device, and an interface that connects the input device such as a keyboard and a pointing device to the bus. For example, when design data and fiber direction information are directly input into the board design assistance device 1, the design data and the fiber direction information are input through the input unit 104 to be provided to the calculator 103. In this structure, the input unit 104 functions as the design data acquirer 11 and the fiber direction acquirer 12.

The transmitter-receiver 105 includes a network terminator or a wireless communication device connected to a network, and a serial interface or a local area network (LAN) interface connected to the network terminator or the wireless communication device. For the structure in which the error information and the review-requesting information are transmitted to a terminal used by the designer, the transmitter-receiver 105 functions as the notifier 15. For the structure in which the board design assistance device 1 acquires the design data and the fiber direction information from an external device or system, the transmitter-receiver 105 functions as the design data acquirer 11 and the fiber direction acquirer 12.

The display 106 is, for example, a cathode ray tube (CRT) or a liquid crystal display (LCD). For example, for a structure in which the design data and the fiber direction information are directly input into the board design assistance device 1, the display 106 displays an operation screen. For a structure in which the error information and the review-requesting information are output through a screen display or a voice output, the display 106 functions as the notifier 15.

The board design assistance device 1 performs the processes of the design data acquirer 11, the fiber direction acquirer 12, the first determiner 13, the second determiner 14, and the notifier 15 shown in FIG. 1 with the control program using, for example, the temporary storage 101, the calculator 103, the storage 102, the input unit 104, the transmitter-receiver 105, and the display 106 as resources.

The hardware configuration and the flowchart described above are mere examples, and may be changed and modified as appropriate.

The calculator 103, the temporary storage 101, the storage 102, the input unit 104, the transmitter-receiver 105, the display 106, and other components that mainly perform the process of the board design assistance device 1 may be implemented by a common computer system, instead of a dedicated system. For example, a computer program used to perform the above operation may be stored in a non-transitory computer-readable recording medium such as a flexible disk, a compact disc read-only memory (CD-ROM), or a digital versatile disc read-only memory (DVD-ROM), distributed and installed in a computer to implement the board design assistance device 1 that performs the above process. In another example, the computer program may be stored in a storage included in a server device on a communication network such as the Internet and downloaded by a common computer system to implement the board design assistance device 1.

In the system with the functions of the board design assistance device 1 implementable by the operating system (OS) and an application program in a shared manner or through cooperation between the OS and the application program, portions executable by the application program other than the OS may be stored in a non-transitory recording medium or a storage.

The computer program may be superimposed on a carrier wave to be provided through a communication network. For example, the computer program may be posted on a bulletin board system (BBS) on a communication network to be provided through the communication network. The above process may be performed by activating the computer program and executing the program in the same manner as in the other application programs under the control of the OS.

In the above embodiment, the fiber direction acquirer 12 in the board design assistance device 1 acquires the fiber direction information, but the fiber direction information may be acquired in any manner. For example, a designer may select between a board design assistance device 1 that determines the lengthwise direction of the board fiber to be horizontal when examining design data for a printed circuit board and a board design assistance device 1 to determine the lengthwise direction of the board fiber to be vertical when examining design data for a printed circuit board. When the functions of the board design assistance device 1 are implemented by applications, the designer selects one of the applications. In this case, the board design assistance device 1 may eliminate the fiber direction acquirer 12. For example, when the lengthwise direction of the board fiber in the printed circuit board design data is predetermined to be horizontal or vertical, the designer simply selects one of the board design assistance devices 1 or one of the applications without inputting the fiber direction information. Also, the board design assistance device 1 does not acquire the fiber direction information from an external device or system.

In the above embodiment, the design data acquirer 11 in the board design assistance device 1 acquires the printed circuit board design data already created, but the design data acquirer 11 may acquire printed circuit board design data in creation. In this case, the first determiner 13 determines, at every placement of a ceramic capacitor on the printed circuit board in the printed circuit board design data in creation, whether the lengthwise direction of the board fiber is perpendicular to the longitudinal direction of the ceramic capacitor being placed. When the first determiner 13 determines that the lengthwise direction of the board fiber is not perpendicular to the longitudinal direction of the ceramic capacitor being placed, the second determiner 14 determines, for the printed circuit board design data in creation, whether wires are routed crosswise from the pads receiving the ceramic capacitor. When determining that the wires are not routed crosswise from the pads receiving the ceramic capacitor, the second determiner 14 transmits, to the notifier 15, error information indicating that the ceramic capacitor deviates from the design rules. The notifier 15 instantly outputs the error information received from the second determiner 14. The designer can learn any deviation from the design rules instantly after routing wires from the pads receiving the ceramic capacitor. This reduces rework on the design and the burden of finding the location deviating from the design rules in the printed circuit board design data already created.

A computer may include both an application for implementing the function of the board design assistance device 1 and an application allowing creation of design data for a printed circuit board. In this case, checking for any deviation from the design rules during creation of printed circuit board design data may delay the operations of the applications depending on the throughput of the computer. Thus, the design data acquirer 11 may automatically acquire the printed circuit board design data upon the designer ending creation of the printed circuit board design data with the application allowing creation of the printed circuit board design data, or may acquire the printed circuit board design data designated by the designer at the time designated by the designer. This may avoid the delay in the operations of the applications. In the former case, the printed circuit board design data can be thoroughly examined without fail. In the latter case, printed circuit board design data items intended by the designer can be collectively examined.

In the above embodiment, the fiber direction acquirer 12 in the board design assistance device 1 receives an input of fiber direction information indicating the lengthwise direction of the board fiber in the printed circuit board design data. For example, when the board design assistance device 1 includes an application allowing creation of the printed circuit board design data, the fiber direction acquirer 12 may display an input screen requesting an input of the lengthwise direction of the board fiber in the printed circuit board design data upon the designer ending creation of the printed circuit board design data. The fiber direction acquirer 12 acquires fiber direction information input through the input screen. In this case, the lengthwise direction of the board fiber is input immediately after the designer ends creation of the printed circuit board design data. The fiber direction acquirer 12 is thus less likely to acquire erroneous fiber direction information.

In the above embodiment, after the first determiner 13 determines whether the lengthwise direction of the board fiber is perpendicular to the longitudinal direction of the ceramic capacitor mounted on the printed circuit board, the second determiner 14 determines, for any ceramic capacitor having the longitudinal direction not perpendicular to the lengthwise direction of the board fiber, whether wires are routed crosswise from the pads receiving the ceramic capacitor mounted on the printed circuit board and then transmits error information to the notifier 15. However, the processing may be performed in any order. Conversely, after the second determiner 14 determines whether wires are routed crosswise from the pads receiving the ceramic capacitor mounted on the printed circuit board, the first determiner 13 may determine, for the ceramic capacitor connected to the pads from which the wires are not routed crosswise, whether the longitudinal direction of the ceramic capacitor mounted on the printed circuit board is perpendicular to the lengthwise direction of the board fiber and may transmit error information to the notifier 15. In another example, the first and second determiners 13 and 14 may separately perform determination on the printed circuit board design data and transmit the determination results to the notifier 15. In this case, the notifier 15 outputs error information specifying a ceramic capacitor for which determination results from both the first and second determiners 13 and 14 are negative.

In the above embodiment, the notifier 15 in the board design assistance device 1 provides, to the designer, a notification including error information specifying the ceramic capacitor deviating from the design rules, or more specifically, the ceramic capacitor having the longitudinal direction not perpendicular to the lengthwise direction of the board fiber and connected to the pads from which wires are not routed crosswise, but the notifier 15 may provide a notification in another manner. The notifier 15 may provide, to the designer, a notification including, together with the error information, priority order information indicating priority order of portions to be corrected of ceramic capacitors deviating from the design rules. In this case, for example, the priority order of the portions to be corrected is descending order of the packaging density of components and wires around the ceramic capacitors on the printed circuit board, or in other words, ascending order of correction flexibility. This allows the designer to correct the ceramic capacitors in ascending order of correction flexibility and easily correct the ceramic capacitors across the printed circuit board.

In the above embodiment, the structure that reduces the likelihood of cracks in the ceramic capacitor includes the structure in which the lengthwise direction of the board fiber is perpendicular to the longitudinal direction of the ceramic capacitor mounted on the printed circuit board and the structure in which wires are routed crosswise from the pads receiving the ceramic capacitor mounted on the printed circuit board. For any other structure possibly found to reduce the likelihood of cracks in the ceramic capacitor, the board design assistance device 1 provides a notification to the designer when the design data for a printed circuit board created by the designer has neither the structure in which the lengthwise direction of the board fiber is perpendicular to the longitudinal direction of the ceramic capacitor mounted on the printed circuit board nor the structure in which wires are routed crosswise from the pads receiving the ceramic capacitor mounted on the printed circuit board. This allows the designer to create design data for a printed circuit board that has at least one structure to reduce the likelihood of cracks in the ceramic capacitor.

The method for assisting in designing a printed circuit board described in the above embodiment is a method for reducing the likelihood of cracks in a ceramic capacitor mounted on the printed circuit board. However, the method may be used for any other components or structures. The above method for assisting in designing a printed circuit board including operations to reduce the likelihood of cracking may be used for any electronic components on a printed circuit board having a longitudinal direction and a crosswise direction, in addition to ceramic capacitors.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2019-220197, filed on Dec. 5, 2019, the entire disclosure of which is incorporated by reference herein.

REFERENCE SIGNS LIST

1 Board design assistance device
3 Wire
11 Design data acquirer
12 Fiber direction acquirer
13 First determiner
14 Second determiner
15 Notifier
21 Ceramic capacitor
22 Pad
41 Expansion pad
42 Overlap
101 Temporary storage
102 Storage
103 Calculator
104 Input unit
105 Transmitter-receiver
106 Display

The invention claimed is:

1. A board design assistance device, comprising:
a first determiner to determine, based on design data for a printed circuit board, whether a lengthwise direction of board fiber in the printed circuit board is perpendicular to a longitudinal direction of an electronic component mounted on the printed circuit board;
a second determiner to determine, based on the design data for the printed circuit board, whether a wire is routed crosswise from a pad receiving the electronic component mounted on the printed circuit board; and
a notifier to provide a notification including error information specifying an electronic component determined by the first determiner to have a longitudinal direction not perpendicular to the lengthwise direction of the board fiber and determined by the second determiner to be connected to a pad from which a wire is not routed crosswise.

2. The board design assistance device according to claim 1, further comprising:
a fiber direction acquirer to receive an input of fiber direction information indicating the lengthwise direction of the board fiber in the design data for the printed circuit board, wherein
the first determiner determines, based on the design data for the printed circuit board, whether the lengthwise direction of the board fiber indicated by the fiber direction information is perpendicular to the longitudinal direction of the electronic component mounted on the printed circuit board.

3. The board design assistance device according to claim 2, wherein
the design data acquirer automatically acquires the design data for the printed circuit board upon an end of creation of the design data for the printed circuit board with an application allowing creation of the design data for the printed circuit board.

4. The board design assistance device according to claim 2, wherein
the design data acquirer acquires the design data for the printed circuit board during creation of the design data for the printed circuit board with an application allowing creation of the design data for the printed circuit board, and
the notifier instantly provides the notification including the error information when the first determiner determines that the longitudinal direction is not perpendicular to the lengthwise direction of the board fiber and the second determiner determines that the wire is not routed crosswise from the pad.

5. The board design assistance device according to claim 2, wherein
the design data acquirer acquires the design data for the printed circuit board designated by a designer of the printed circuit board at a time designated by the designer.

6. The board design assistance device according to claim 2, wherein
when the first determiner determines, based on the design data for the printed circuit board, that the lengthwise direction of the board fiber in the printed circuit board is perpendicular to the longitudinal direction of the electronic component mounted on the printed circuit board, the second determiner does not determine whether the wire is routed crosswise from the pad receiving the electronic component mounted on the printed circuit board.

7. The board design assistance device according to claim 1, further comprising:
a fiber direction acquirer to acquire fiber direction information indicating the lengthwise direction of the board fiber, the fiber direction information being pre-associated with the design data for the printed circuit board, wherein
the first determiner determines, based on the design data for the printed circuit board, whether the lengthwise direction of the board fiber indicated by the fiber direction information is perpendicular to the longitudinal direction of the electronic component mounted on the printed circuit board.

8. The board design assistance device according to claim 7, wherein
the design data acquirer automatically acquires the design data for the printed circuit board upon an end of creation of the design data for the printed circuit board with an application allowing creation of the design data for the printed circuit board.

9. The board design assistance device according to claim 7, wherein
the design data acquirer acquires the design data for the printed circuit board during creation of the design data for the printed circuit board with an application allowing creation of the design data for the printed circuit board, and
the notifier instantly provides the notification including the error information when the first determiner determines that the longitudinal direction is not perpendicular to the lengthwise direction of the board fiber and the second determiner determines that the wire is not routed crosswise from the pad.

10. The board design assistance device according to claim 7, wherein
the design data acquirer acquires the design data for the printed circuit board designated by a designer of the printed circuit board at a time designated by the designer.

11. The board design assistance device according to claim 7, wherein
when the first determiner determines, based on the design data for the printed circuit board, that the lengthwise direction of the board fiber in the printed circuit board is perpendicular to the longitudinal direction of the electronic component mounted on the printed circuit board, the second determiner does not determine whether the wire is routed crosswise from the pad receiving the electronic component mounted on the printed circuit board.

12. The board design assistance device according to claim 1, wherein
the design data acquirer automatically acquires the design data for the printed circuit board upon an end of creation of the design data for the printed circuit board with an application allowing creation of the design data for the printed circuit board.

13. The board design assistance device according to claim 12, wherein
when the first determiner determines, based on the design data for the printed circuit board, that the lengthwise direction of the board fiber in the printed circuit board is perpendicular to the longitudinal direction of the electronic component mounted on the printed circuit board, the second determiner does not determine whether the wire is routed crosswise from the pad receiving the electronic component mounted on the printed circuit board.

14. The board design assistance device according to claim 1, wherein
the design data acquirer acquires the design data for the printed circuit board during creation of the design data for the printed circuit board with an application allowing creation of the design data for the printed circuit board, and
the notifier instantly provides the notification including the error information when the first determiner determines that the longitudinal direction is not perpendicular to the lengthwise direction of the board fiber and the second determiner determines that the wire is not routed crosswise from the pad.

15. The board design assistance device according to claim 1, wherein
the design data acquirer acquires the design data for the printed circuit board designated by a designer of the printed circuit board at a time designated by the designer.

16. The board design assistance device according to claim 1, wherein
when the first determiner determines, based on the design data for the printed circuit board, that the lengthwise direction of the board fiber in the printed circuit board is perpendicular to the longitudinal direction of the electronic component mounted on the printed circuit board, the second determiner does not determine whether the wire is routed crosswise from the pad receiving the electronic component mounted on the printed circuit board.

17. The board design assistance device according to claim 1, wherein
when the second determiner determines, based on the design data for the printed circuit board, that the wire is routed crosswise from the pad receiving the electronic component mounted on the printed circuit board, the first determiner does not determine whether the lengthwise direction of the board fiber in the design data for the printed circuit board is perpendicular to the longitudinal direction of the electronic component mounted on the printed circuit board.

18. The board design assistance device according to claim 1, wherein
the notifier provides a notification including, together with the error information, priority order information indicating priority order of portions to be corrected of electronic components mounted on the printed circuit board.

19. A board design assistance method, comprising:
determining, based on design data for a printed circuit board, whether a lengthwise direction of board fiber in the printed circuit board is perpendicular to a longitudinal direction of an electronic component mounted on the printed circuit board;
determining, based on the design data for the printed circuit board, whether a wire is routed crosswise from a pad receiving the electronic component mounted on the printed circuit board; and
providing a notification including error information specifying an electronic component determined to have a longitudinal direction not perpendicular to the lengthwise direction of the board fiber and determined to be connected to a pad from which a wire is not routed crosswise.

20. A non-transitory computer readable recording medium storing a program, the program causing a computer to function as
a first determiner to determine, based on design data for a printed circuit board, whether a lengthwise direction of board fiber in the printed circuit board is perpendicular to a longitudinal direction of an electronic component mounted on the printed circuit board,
a second determiner to determine, based on the design data for the printed circuit board, whether a wire is routed crosswise from a pad receiving the electronic component mounted on the printed circuit board, and
a notifier to provide a notification including error information specifying an electronic component determined by the first determiner to have a longitudinal direction not perpendicular to the lengthwise direction of the board fiber and determined by the second determiner to be connected to a pad from which a wire is not routed crosswise.

* * * * *